(12) United States Patent
Shiue et al.

(10) Patent No.: US 12,249,068 B2
(45) Date of Patent: Mar. 11, 2025

(54) HEALTH MANAGEMENT SYSTEM USING CONTACTLESS PHYSIOLOGICAL MEASUREMENT TECHNOLOGY

(71) Applicant: FaceHeart Inc., Hsinchu (TW)

(72) Inventors: Tsuey-Huey Shiue, Hsinchu (TW);
Yi-Chiao Wu, New Taipei (TW);
Li-Wen Chiu, Tainan (TW)

(73) Assignee: FaceHeart Inc., Hsinchu (TW)

( * ) Notice: Subject to any disclaimer, the term of this patent is extended or adjusted under 35 U.S.C. 154(b) by 442 days.

(21) Appl. No.: 17/697,914

(22) Filed: Mar. 17, 2022

(65) Prior Publication Data
US 2022/0301160 A1 Sep. 22, 2022

(30) Foreign Application Priority Data
Mar. 17, 2021 (TW) .................. 110109510

(51) Int. Cl.
*G06T 7/00* (2017.01)
*G06V 40/16* (2022.01)

(52) U.S. Cl.
CPC .......... *G06T 7/0012* (2013.01); *G06V 40/161* (2022.01); *G06V 40/168* (2022.01);
(Continued)

(58) Field of Classification Search
CPC ......... G06T 7/0012; G06T 2207/30076; G06T 2207/30201; G06T 7/73; G06T 2207/10024; G06T 7/90; G06V 40/161; G06V 40/168; G06V 40/15; G06V 40/16; G06V 40/45; G06F 2218/08; G16H 10/20;
(Continued)

(56) References Cited

U.S. PATENT DOCUMENTS

| 10,987,008 B2 * | 4/2021 | Verkruijsse | ............ A61B 5/681 |
| 2011/0251493 A1 * | 10/2011 | Poh | ...................... G06F 18/2134 |
| | | | 382/128 |

(Continued)

FOREIGN PATENT DOCUMENTS

| CN | 107126203 A | 9/2017 |
| CN | 111820870 A | 10/2020 |
| TW | M578864 U | 6/2019 |

*Primary Examiner* — Jose L Couso
(74) *Attorney, Agent, or Firm* — ANOVA LAW GROUP, PLLC (57) ABSTRACT

A health management system using contactless physiological measurement technology is disclosed. The health management system principally comprises a camera and a first processor, of which the camera is faced to a user for capturing a user image. The first processor is particularly configured to have a face detection unit and an activity index calculating unit therein. By such arrangement, after receiving the user image from the camera, the first processor detects a face portion from the user image, thereby subsequently extracting a PPG signal from the face portion. Consequently, after completing at least one process of the PPG signal, multiple indexes for describing a user's health activity are generated. The health activity indexes include health index, activity index, stability index, relaxation index, metabolism index, and balance index. Therefore, the first processor achieves an evaluation of the user's health activity state according to the forgoing health activity indexes.

13 Claims, 8 Drawing Sheets

(52) U.S. Cl.
CPC ............... *G06T 2207/30076* (2013.01); *G06T 2207/30201* (2013.01)

(58) Field of Classification Search
CPC ........ G16H 15/00; G16H 30/20; G16H 30/40; G16H 40/63; G16H 40/67; G16H 50/20; G16H 50/30; G16H 50/70; A61B 5/0033; A61B 5/0077; A61B 5/02416; A61B 5/14507; A61B 5/14551; A61B 5/443; A61B 5/4875; A61B 5/7278; A61B 5/0205; A61B 5/02055; A61B 5/021; A61B 5/024; A61B 5/1032; A61B 5/7207; A61B 5/0013
See application file for complete search history.

(56) References Cited

U.S. PATENT DOCUMENTS

| | | | |
|---|---|---|---|
| 2015/0148687 A1* | 5/2015 | Kitajima | A61B 5/1176 600/477 |
| 2016/0343135 A1* | 11/2016 | De Haan | G06V 10/763 |
| 2016/0367157 A1 | 12/2016 | Blake et al. | |
| 2017/0202505 A1* | 7/2017 | Kirenko | A61B 5/7278 |
| 2018/0042486 A1* | 2/2018 | Yoshizawa | A61B 5/02125 |
| 2019/0313907 A1* | 10/2019 | Khachaturian | G16H 40/67 |
| 2020/0163560 A1* | 5/2020 | Chang | A61B 5/7257 |
| 2020/0221956 A1* | 7/2020 | Tzvieli | G01J 5/0025 |
| 2020/0245903 A1 | 8/2020 | Hutchinson et al. | |
| 2020/0330042 A1 | 10/2020 | Shiue et al. | |
| 2021/0280322 A1* | 9/2021 | Frank | G16H 50/20 |
| 2022/0395186 A1* | 12/2022 | Yoshizawa | A61B 5/02055 |

* cited by examiner

HEALTH MANAGEMENT SYSTEM USING CONTACTLESS PHYSIOLOGICAL MEASUREMENT TECHNOLOGY

BACKGROUND OF THE INVENTION

1. Field of the Invention

The present invention relates to the technology field of physiological measurement devices, and more particularly to a health management system using contactless physiological measurement technology.

2. Description of the Prior Art

Because blood oxygen saturation (SpO2) and heart rate (HR) are two of multiple physiological parameters they are regarded as two important health indices, commercial wearable electronic devices like smart bracelet and smart watch are all designed to have function of measuring these two physiological parameters. In addition, by installing a specially-developed application program in a wearable electronic device, the wearable electronic device therefore becomes a mobile health management system for its wearer (i.e., user). However, it is a pity that user's feedback has demonstrated the fact that the forgoing wearable electronic devices shows some drawbacks in practical use. For example, the wearable electronic devices cause some users who have sensitive skin to be subject to skin allergy.

On the other hand, Taiwan Patent No. 1653601 has disclosed a personalized health management system, which comprises a host device and one or more physiological measurement devices, and is placed in a public region like hospital or convenience store. When using the personalized health management system, a user is firstly required to establish his personal information in the host device, including body height, body weight and age. After that, the user is allowed to start the measurement of personal physiological parameters by using the physiological measurement device, such that a personal health evaluation table is subsequently generated by the host device. However, due to the fact that the personalized health management system is a costly apparatus because of including a huge host device and multiple physiological measurement devices, the personalized health management system is commonly purchased by a government agency, thereby being is placed in a public region for serving the public.

In addition, Taiwan Patent Public No. TW201143712A has disclosed a handheld health management device, which includes at least one contact type measurement unit for use in the measurement of a user's physiological parameters like blood pressure, blood sugar, body temperature, body weight, body fat and so on. Moreover, the handheld health management device further includes a warning unit, which is configured to produce a warning signal in case of at least one of the user's multi physiological parameters is over corresponding reference value. In spite of that, the user is required to touch and/or contact the measurement unit during operating the handheld health management device to accomplish the measurement of his physiological parameters, and that causes a significant inconvenience for the user.

From above descriptions, it is understood that there is still room for improvement in the conventional health management devices. In view of that, inventors of the present invention have made great efforts to make inventive research and eventually provided a health management system using contactless physiological measurement technology.

SUMMARY OF THE INVENTION

The primary objective of the present invention is to disclose a health management system using contactless physiological measurement technology. The health management system principally comprises a camera and a first processor, of which the camera is faced to a user for capturing a user image. The first processor is particularly configured to have a face detection unit and an activity index calculating unit therein. By such arrangement, after receiving the user image from the camera, the first processor detects a face portion from the user image, thereby subsequently extracting a photoplethysmography (PPG) signal from the face portion.

Consequently, after completing at least one process of the PPG signal, multiple indexes for describing a user's health activity are generated. The health activity indexes include health index, activity index, stability index, relaxation index, metabolism index, and balance index. As a result, the first processor achieves an evaluation of the user's health activity state according to the forgoing health activity indexes.

According to the plurality of health activity indexes, the health management system of the present invention is able to show an infographic for describing variations of the user's health activity state in a period of time.

For achieving the primary objective, the present invention discloses an embodiment for the health management system using contactless physiological measurement technology, comprising:

a camera, being faced to a user for capturing a user image;

a first processor, being coupled to the camera, and comprising one or more embedded programs including instructions for:

detecting a face portion from the user image;

extracting a photoplethysmography (PPG) signal from the face portion; and applying at least one signal process to the PPG signal, thereby generating a plurality of health activity indexes with respect to the user;

wherein the plurality of health activity indexes comprises health index, activity index, stability index, relaxation index, metabolism index, and balance index.

In one embodiment, the first processor is integrated in an electronic device that is coupled to the camera, such that the first processor is therefore coupled to the camera. The electronic device is selected from a group consisting of cloud server, desktop computer, all-in-one computer, embedded computer, laptop computer, tablet computer, smart phone, smart watch, smart glasses, smart television, video door phone system, and home healthcare computer device, and comprises a second processor, a display, a memory, and a communication interface, such that the second processor receiving the plurality of health activity indexes from the first processor, thereby controlling the display to show the plurality of health activity indexes by a form of numeric values and/or infographics.

In a practicable embodiment, the camera and the first processor are both integrated in an electronic device, and the electronic device being selected from a group consisting of all-in-one computer, embedded computer, laptop computer, tablet computer, smart phone, smart watch, smart glasses, smart television, video door phone system, and home healthcare computer device.

In one embodiment, by applying the at least one signal process to the PPG signal, the PPG signal is firstly converted to a time-domain signal, and at least one time-domain parameter is subsequently extracted from the time-domain signal; the time-domain parameter being selected from a group consisting of standard deviation of all normal to normal intervals (SDNN), root mean square successive differences (RMSSD), number of pairs of adjacent normal to normal intervals differing by more than 50 ms (NN50), proportion of NN50 divided by a total number of all normal to normal intervals (pNN50).

In one embodiment, by applying the at least one signal process to the PPG signal, the PPG signal is firstly converted to a frequency-domain signal, and at least one frequency-domain parameter is subsequently extracted from the frequency-domain signal; the frequency-domain parameter being selected from a group consisting of total power (TP), high frequency power (HF), low frequency power (LF), very low frequency power (VLF), ultra low frequency power (ULF), low frequency proportion (LF %), and LF/HF ratio.

In a practicable embodiment, the first processor further comprises one or more embedded programs including instructions for:

applying at least one signal process to the PPG signal, thereby generating a plurality of physiological parameters with respect to the user;

extracting facial features from the face portion in the user image, and then applying a feature matching between the facial features and a facial feature template that is stored in the memory, thereby accomplishing a face recognition of the user; and evaluating a health activity state of the user according to the plurality of health activity indexes.

BRIEF DESCRIPTION OF THE DRAWINGS

The invention as well as a preferred mode of use and advantages thereof will be best understood by referring to the following detailed descriptions of an illustrative embodiment in conjunction with the accompanying drawings, wherein.

DETAILED DESCRIPTION OF THE PREFERRED EMBODIMENTS

To more clearly describe a health management system using contactless physiological measurement technology, embodiments of the health management system using contactless physiological measurement technology according to the present invention will be described in detail with reference to the attached drawings hereinafter.

Figure 1:
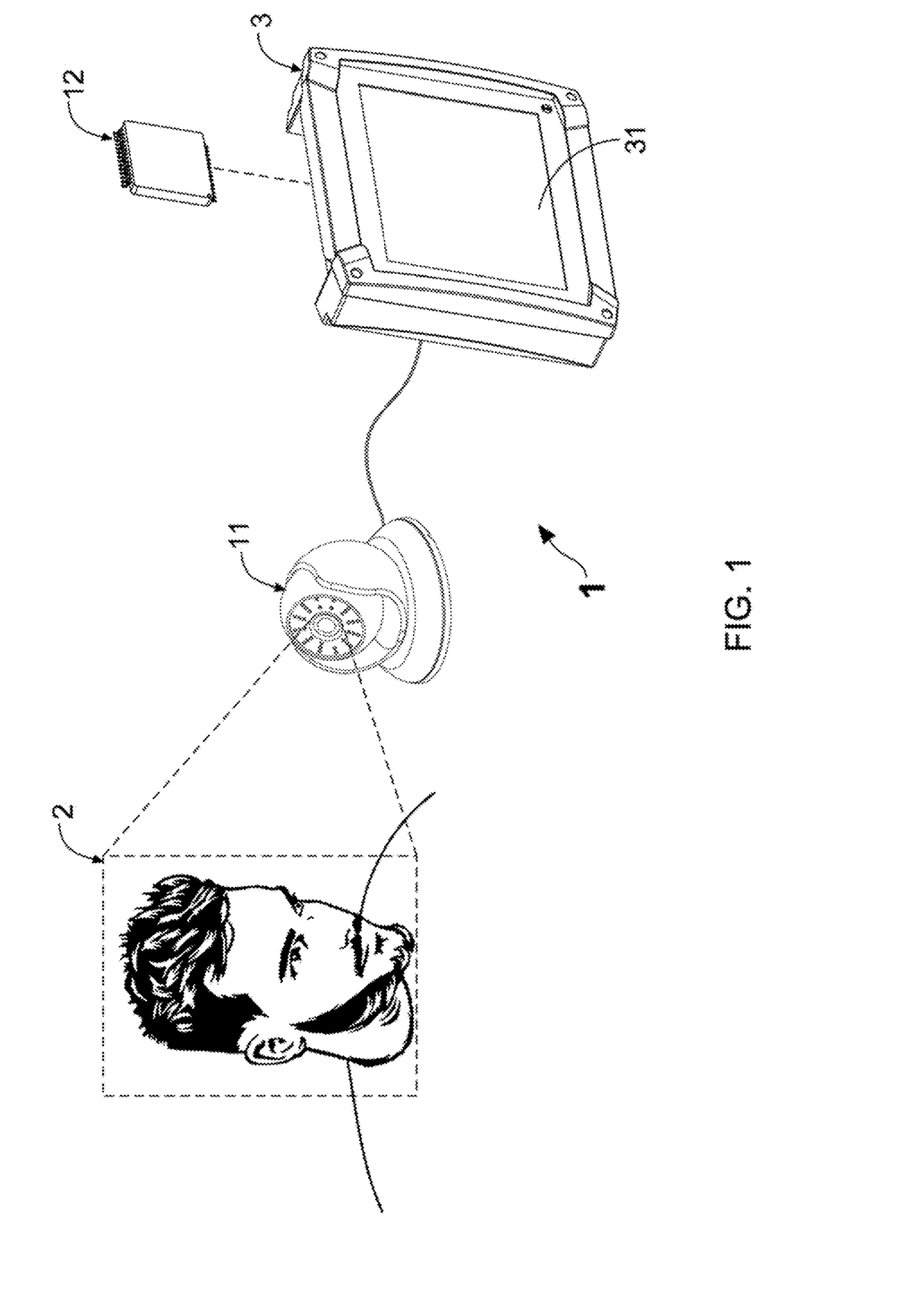
FIG. 1 shows a first schematic diagram for describing a health management system using contactless physiological measurement technology according to the present invention.
Figure 2:
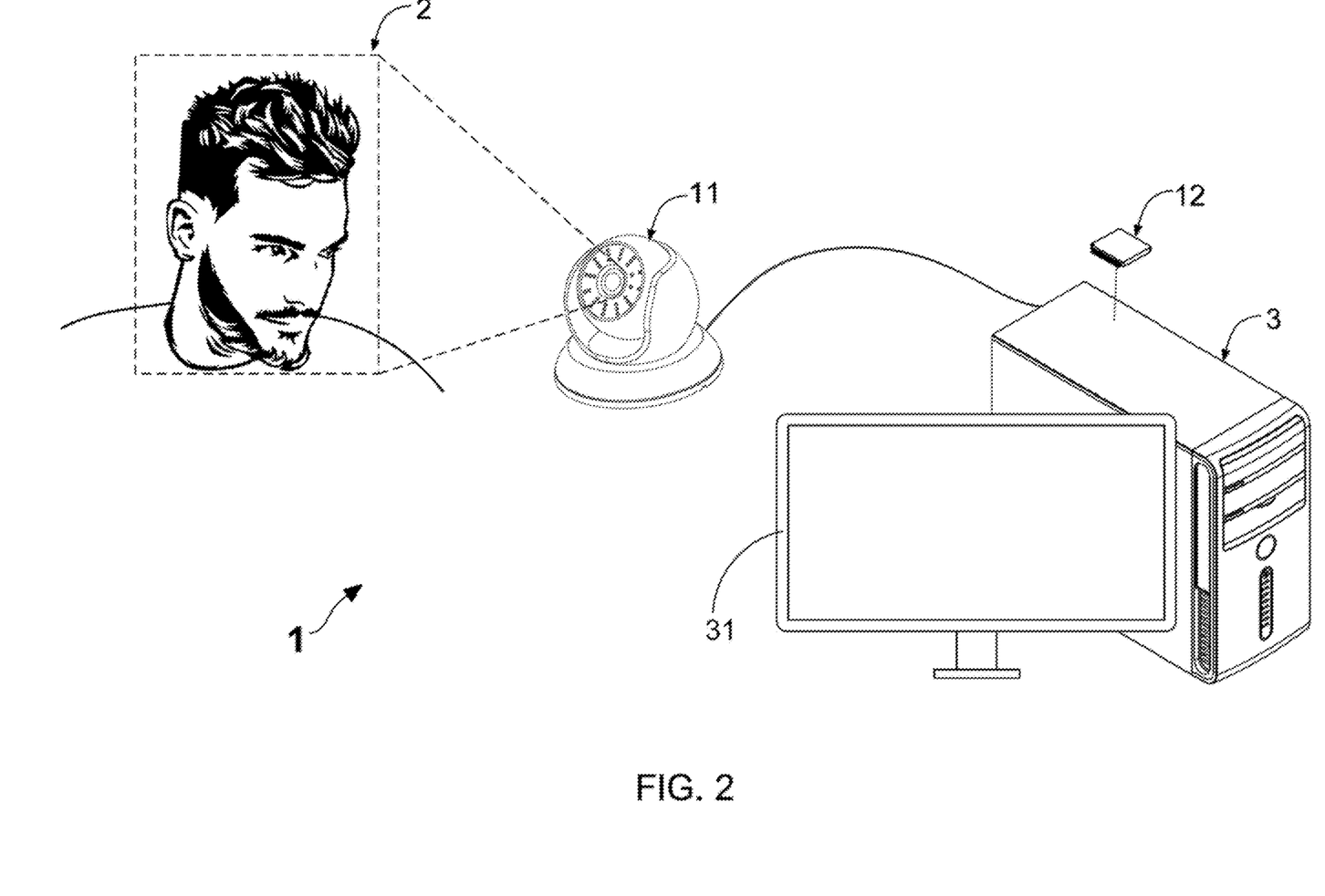
FIG. 2 shows a second schematic diagram for describing the health management system using contactless physiological measurement technology according to the present invention.

With reference to FIG. 1, there is shown a first schematic diagram for describing a health management system using contactless physiological measurement technology according to the present invention. Moreover, FIG. 2 shows a second schematic diagram of the health management system. As FIG. 0.1 and FIG. 2 shows, the health management system 1 principally consists of a camera and a first processor 12. It is worth noting that, FIG. 1 depicts that the first processor 12 is integrated in an electronic device 3 by a form of electronic chip. The electronic device 3 includes a second processor 30, a display 31, and a memory 32, and is coupled to the camera 11, such that the first processor 12 is able to control the camera 11. In this embodiment, the electronic device 3 can be a cloud server, a desktop computer, an all-in-one computer, an embedded computer, a laptop computer, a tablet computer, a smart phone, a smart watch, a smart glasses, a smart television, a video door phone system, or a home healthcare computer device.

On the other hand, FIG. 2 depicts that the first processor 12 is integrated in an electronic device 3 that is simultaneously coupled to the camera 11 and a display 31 and, such that the first processor 12 is able to control the camera 11. In this embodiment, the display 31 can be a television, a computer monitor, a portable monitor, a projector screen, or a touch screen monitor. According to the foregoing descriptions, it is known that the first processor 12 can be integrated in any one kind of electronic device that includes or is coupled to a display. Similarly, according to the illustrations of FIG. 1 and FIG. 2, it is also known that the camera 11 can be integrated in or be coupled to the electronic device, thereby being controlled by the first processor 12.

Figure 3:
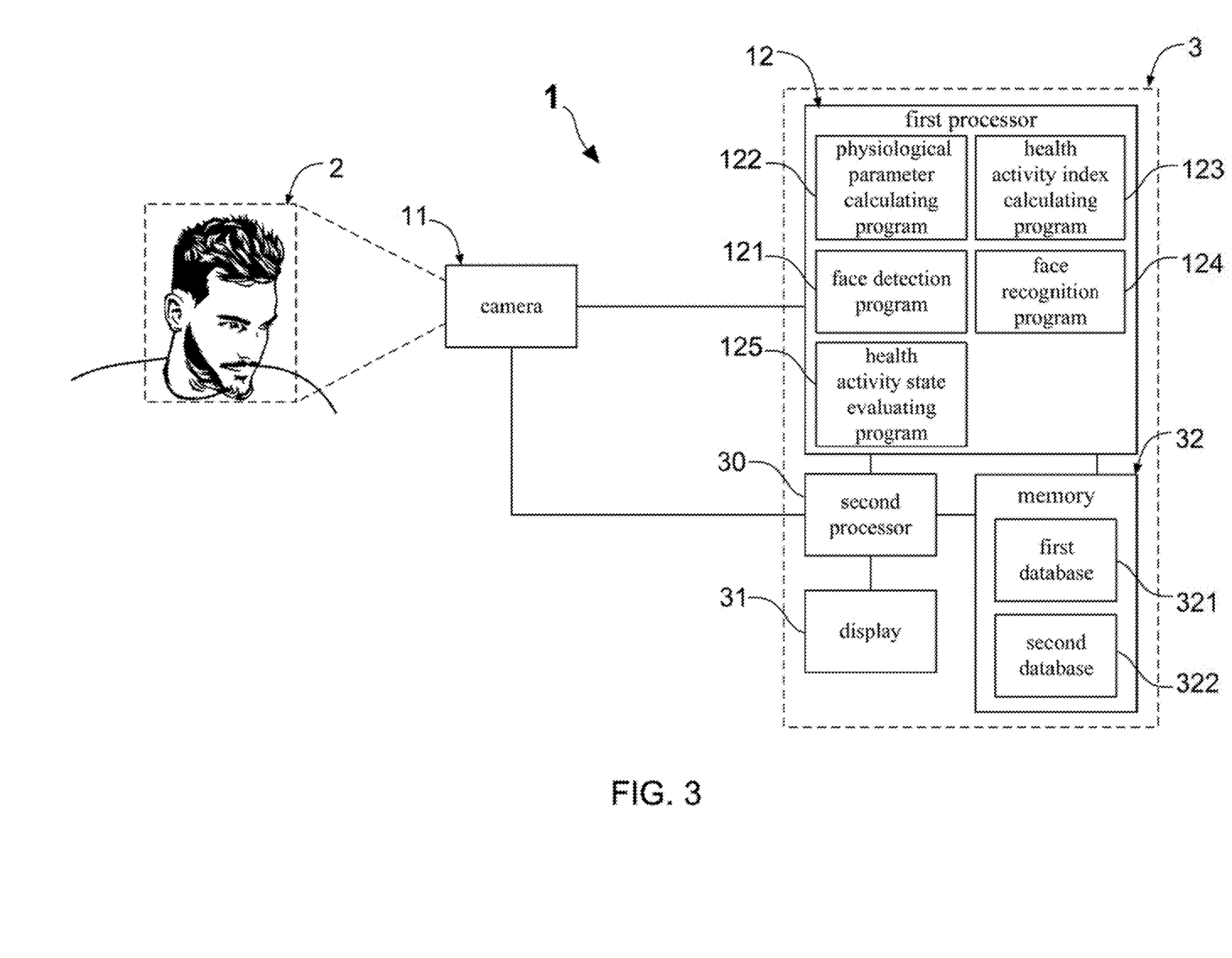
FIG. 3 shows a first block diagram of the health management system.

Please refer to FIG. 1 again, and please simultaneously refer to FIG. 3 that illustrates a first block diagram of the health management system 1. As FIG. 1 and FIG. 3 show, the camera 11 is faced to a user 2 for capturing a user image, and the first processor 12 is coupled to the camera 11 so as to receive the user image. Particularly, there are one or more programs embedded in the first processor 12, such that the first processor 12 is able to perform multiple functionalities by executing the instructions included in the programs. The programs comprises: face detection program 121, physiological parameter calculating program 122, health activity index calculating program 123, face recognition program 124, and health activity state evaluating program 125. By such arrangement, after receiving the user image, the first processor 12 detects a face portion from the user image by executing the face detection program 121, and then extracting a photoplethysmography (PPG) signal from the face portion by executing the health activity index calculating program 123. Consequently, after applying at least one signal process to the PPG signal, a plurality of health activity indexes with respect to the user 2 are therefore generated under executing the health activity index calculating program 123. The plurality of health activity indexes comprises health index, activity index, stability index, relaxation index, metabolism index, and balance index. On the other hand, after the PPG signal is extracted from the face portion in the user image, the first processor can also execute the physiological parameter calculating program 122 to apply at least one signal process to the PPG signal, thereby generating a plurality of physiological parameters with respect to the user 2.

Engineers skilled in development of image processing algorithms certainly know that, face detection program 121 use algorithm to find the user's face within the user image. The algorithm typically starts by searching for user eyes, i.e., one of the easiest features to detect. The algorithm might then attempt to detect eyebrows, mouth, nose, nostrils and iris, so as to determine a facial region (i.e., the foregoing face portion) on the user image. Literature I has relatively complete instructions for the face detection algorithm(s). Herein, literature I is written by Wong et.al, and is entitled with "An efficient algorithm for human face detection and facial feature extraction under different conditions" so as to be published on Pattern Recognition, Volume 34, Issue 10, 2001, Pages 1993-2004.

According to the present invention, the plurality of health activity indexes comprises health index, activity index, stability index, relaxation index, metabolism index, and balance index. On the other hand, engineers skilled in the technology field of non-contact type physiological measurement should know that, the camera 11 and the electronic device 3 having the first processor 12 therein constitute a contactless physiological measurement system, and this contactless physiological measurement system can be operated for measuring an imaging photoplethysmography (iPPG) signal or a remote photoplethysmography (rPPG) signal from the user 2. Of course, engineers skilled in the technology field of non-contact type physiological measurement certainly knows how to complete the measurement of multiple physiological parameters with respect to the user by collecting the iPPG signal or the rPPG signal. For example, China Patent Publication No. CN106343986A has disclosed the way to measure blood pressure by collecting PPG signal from a man. Moreover, literatures II, III, and IV have disclosed the way to measure SBP, DBP, heart rate (HR), respiratory rate, and blood oxygen saturation (SpO2) by collecting PPG signal from a man.

Herein, literature II is written by Goudarzi et.al, and is entitled with "Using imaging Photoplethysmography (iPPG) Signal for Blood Pressure Estimation" so as to be published on 2020 International Conference on Machine Vision and Image Processing (MVIP), Iran, 2020, pp. 1-6. On the other hand, literature III is written by Kong et.al, and is entitled with "Non-contact detection of oxygen saturation based on visible light imaging device using ambient light" so as to be published on Optics Express Vol. 21, Issue 15, pp. 17464-17471 (2013). Moreover, literature III is written by Sanyal et.al, and is entitled with "Algorithms for Monitoring Heart Rate and Respiratory Rate From the Video of a User's Face" so as to be published on IEEE Journal of Translational Engineering in Health and Medicine, Vol. 6, pp. 1-11, 2018.

According to the present invention, after the PPG signal is extracted from the face portion in the user image, the first processor 12 executes the health activity index calculating program 123 to applying at least one signal process to the PPG signal, thereby generating a plurality of health activity indexes with respect to the user 2. The plurality of health activity indexes comprises health index, activity index, stability index, relaxation index, metabolism index, and balance index. Doctors and nursing personnel certainly know that, the autonomic nervous system has two principal branches: the sympathetic nervous system and the parasympathetic nervous system. The sympathetic nervous system functions in energy generation and arousal, helping to mobilize the body during times of excitement, stress, and when activity and a quick response might be needed. For example, during threatening situations, the SNS can accelerate the heart, dilate the eyes' pupils, constrict visceral blood vessels, shunt blood to active skeletal muscles, inhibit activity of the stomach and intestine, dilate the bronchioles in the lung, inhibit the emptying of the bladder, and release glucose from the liver. On the contrary, in case of human is in a state of relaxation, sleep, or rest, the parasympathetic nervous system (PSNS) is activated to slow heart and breathing rates, and to lower blood pressure and promotes digestion. Therefore, clinic data have indicated that, human may be subject to anxiety, palpitations, and/or high blood pressure in case of the SNS is over activated. However, when the PSNS is over activated, human may be in a state of poor mental health, inactive, and/or poor physical strength.

Moreover, doctors and nursing personnel also know that, heart rate (HR) and/or heart rate variability (HRV) can be adopted for being indexes to evaluate the state of the autonomic nervous system. For example, when the SNS is activated more than the PSNS, the heart rate has an increase but the heart rate variability is subject to a decrease. On the contrary, the heart rate has a decrease when the PSNS is activated more than the SNS.

Therefore, after detecting a face portion from the user image, the first processor 12 executes the health activity index calculating program 123 to extract a photoplethysmography (PPG) signal from the face portion, and then to apply at least one signal process to the PPG signal so as to obtain a plurality of health activity indexes with respect to the user 2. As described in more detail below, by applying the at least one signal process to the PPG signal, the PPG signal is firstly converted to a frequency-domain signal. Subsequently, the at least one frequency-domain parameter is subsequently extracted from the frequency-domain signal. The frequency-domain parameters are as follows: total power (TP), high frequency power (HF), low frequency power (LF), very low frequency power (VLF), ultra low frequency power (ULF), low frequency proportion (LF %), and LF/HF ratio.

Moreover, in a practicable embodiment, the PPG signal can be firstly converted to a time-domain signal. Subsequently, at least one time-domain parameter is extracted from the time-domain signal. The time-domain parameters are as follows: standard deviation of all normal to normal intervals (SDNN), root mean square successive differences (RMSSD), number of pairs of adjacent normal to normal intervals differing by more than 50 ms (NN50), proportion of NN50 divided by a total number of all normal to normal intervals (pNN50).

Figure 4:
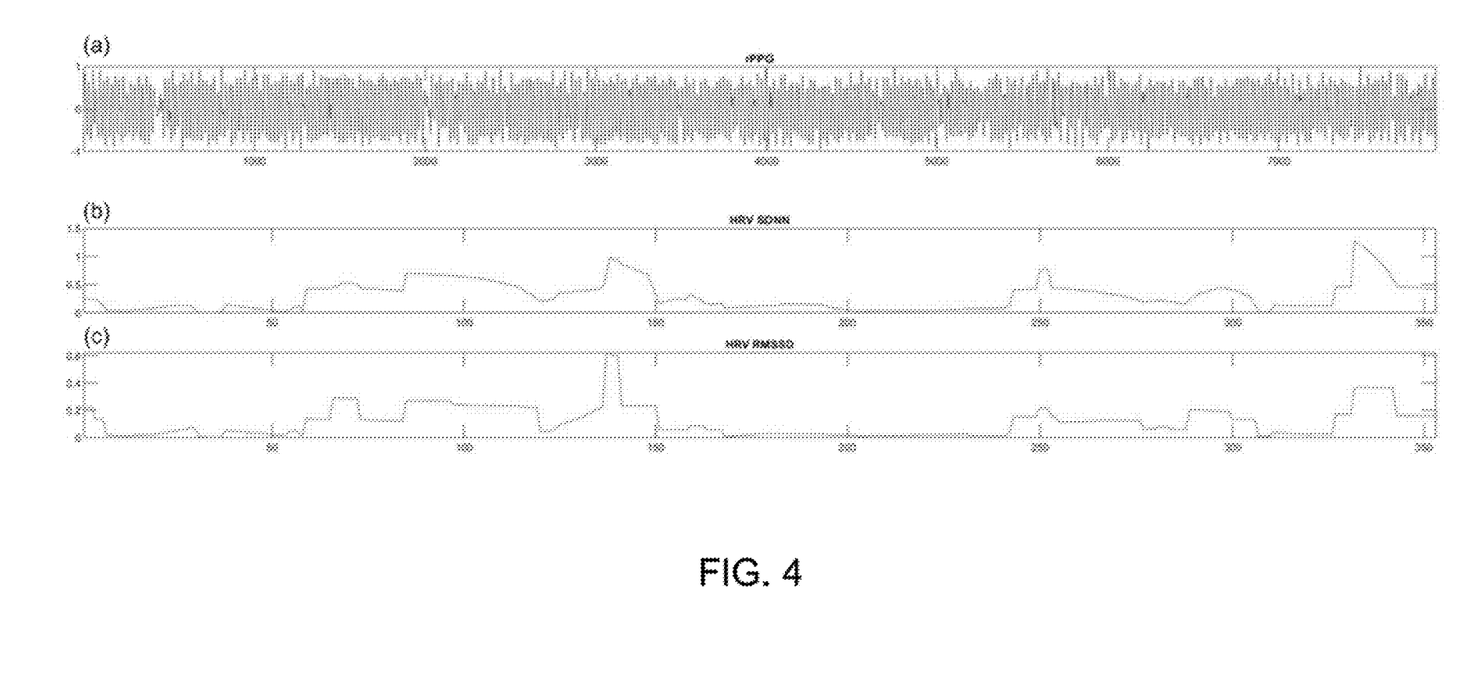
FIG. 4 shows a waveform diagram of a PPG signal, two waveform diagrams of the PPG signal that has been treated with signal process.

For example, FIG. 4 shows a waveform diagram of a rPPG signal, two waveform diagrams of the PPG signal that has been treated with signal process. As explained in detail below, waveform diagram (a) is a PPG signal extracted from the face portion in the user image, and waveform diagrams (b) and (c) are all converted from the PPG signal. Therefore, the first processor 12 can obtain a data of SDNN from the waveform diagram (b), and obtain a data of RMSSD from the waveform diagram (c). Engineers skilled in the technology field of physiological measurement certainly know that, SDNN, RMSSD, NN50, and PNN50 are commonly adopted for being indexes to calculate the HRV.

Briefly speaking, as following table (1) shows, after converting the PPG signal to a time-domain signal and/or a frequency-domain signal, the first processor 12 is able to subsequently obtain the health activity indexes from the time-domain signal and/or the frequency-domain signal.

TABLE 1

| health activity indexes | Signal process |
|---|---|
| Health | Applying a signal process of SDNN to the PPG signal, so as to obtain SDNN data for calculating the health index. |
| Activity | Converting the PPG signal to a frequency-domain signal, and then acquiring low frequency (0.04-0.15 Hz) power (LF) data from the frequency-domain signal, thereby calculating the activity index. |
| Stability | Converting the PPG signal to a frequency-domain signal, and then acquiring high frequency (0.15-0.5 Hz) power (HF) data from the frequency-domain signal, thereby calculating the activity index. |
| Relaxation | Applying a signal process of SDNN to the PPG signal, so as to obtain SDNN data for calculating the health index. |
| Metabolism | Converting the PPG signal to a frequency-domain signal, and then calculating low frequency proportion (LF %) after acquiring LF data and HF data from the frequency-domain signal, thereby calculating the metabolism index. |
| Balance | Converting the PPG signal to a frequency-domain signal, and then calculating a ratio of LF to HF (i.e., LF/HF) after acquiring LF data and HF data from the frequency-domain signal, thereby calculating the balance index. |

Figure 5A:
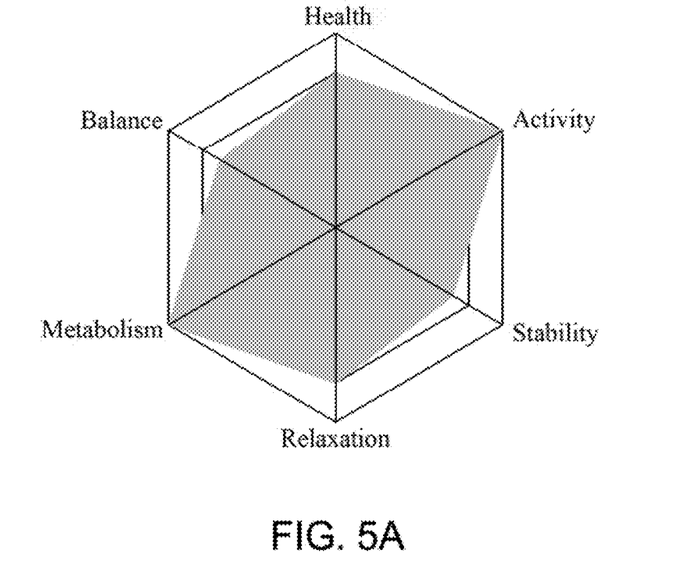
FIG. 5A shows a hexagonal radar chart for shows six kinds of health activity indexes.
Figure 5B:
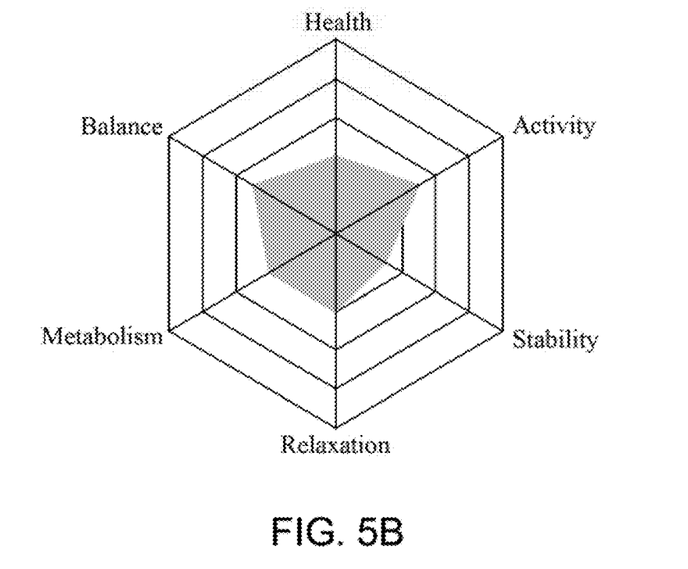
FIG. 5B shows a hexagonal radar chart for shows six kinds of health activity indexes.

FIG. 5A shows one hexagonal radar chart for shows six kinds of health activity indexes, and FIG. 5B shows another one hexagonal radar chart for shows six kinds of health activity indexes. According to FIG. 5A, it is understood that, the six health activity indexes indicate that the user 2 has a good state in spirit, mental, and physiological. However, according to FIG. 5B, it is known that, the six health activity indexes indicate that the user 2 has a relatively depression state in spirit, mental, and physiological.

In addition, FIG. 3 depicts that the first processor 12 also has a health activity state evaluating program 125, which is executed by the first processor 12 to evaluate a health activity state of the user according to the plurality of health activity indexes. For example, in case of the hexagonal radar chart showing that the health index is high but the balance index is relatively low, the user 2 may stay in a situation of intensive concentration, nervous and stress. On the other hand, if the hexagonal radar chart shows that both the metabolism index and the balance index are high but both the activity index and the health index are relatively low, the user 2 may stay in a relax or rest state.

In addition, FIG. 3 also depicts that there is a face recognition program 124 installed in the first processor 12. By executing the face recognition program 124, the first processor 12 is able to extract facial features from the face portion in the user image, and then applying a feature matching between the facial features and a facial feature template that is stored in the memory 32, thereby accomplishing a face recognition of the user. Moreover, there are multiple databases established in the memory 32 of the electronic device 3, and the multiple databases comprises a first database 321 and a second database 322. According to the present invention, the first databases stores N number of personal information sets, and also stores N number of the facial feature templates that are respectively corresponding to the N number of personal information sets. On the other hand, the second database 322 stores a plurality of first data set and a plurality of second data set, wherein each the first data set consists of the plurality of physiological parameters, each the second data set consists of the plurality of health activity indexes, and the plurality of first data set and the plurality of second data set are in accordance with the N number of personal information sets.

Because the user 2 may operate this health management system 1 to measure his physiological parameters and evaluate his health activity state every day, the plurality of physiological parameters enclosed in the first data set are further classified into to a history data and an immediate data, and the plurality of health activity indexes enclosed in the second data set being further classified into a history data and an immediate data. As such, after the second processor 30 receives the plurality of health activity indexes and the plurality of physiological parameters from the first processor 12, the second processor 30 is able to control the display 31 to show the plurality of health activity indexes by a form of numeric values and/or infographics, and/or to show the plurality of physiological parameters by a form of numeric values and/or infographics.

Figure 6:
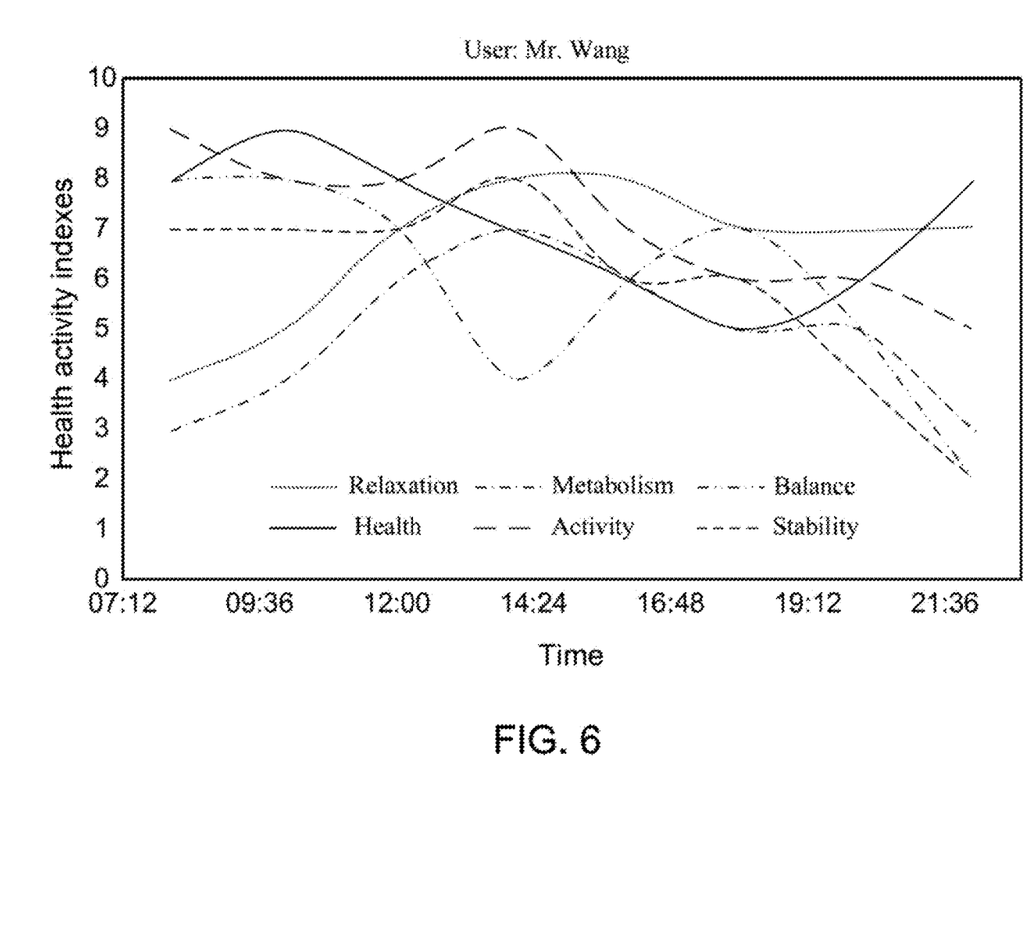
FIG. 6 shows a curve chart for shows six kinds of health activity indexes in a period of time.

FIG. 6 shows a curve chart for shows six kinds of health activity indexes in a period of time. After the user using this health management system 1 to record his physiological parameters and health activity indexes for a period of time, the second processor 30 of the electronic device 3 is able to control the display 31 to show a curve chart for describing variations of the user's health activity state in this period of time.

Figure 7:
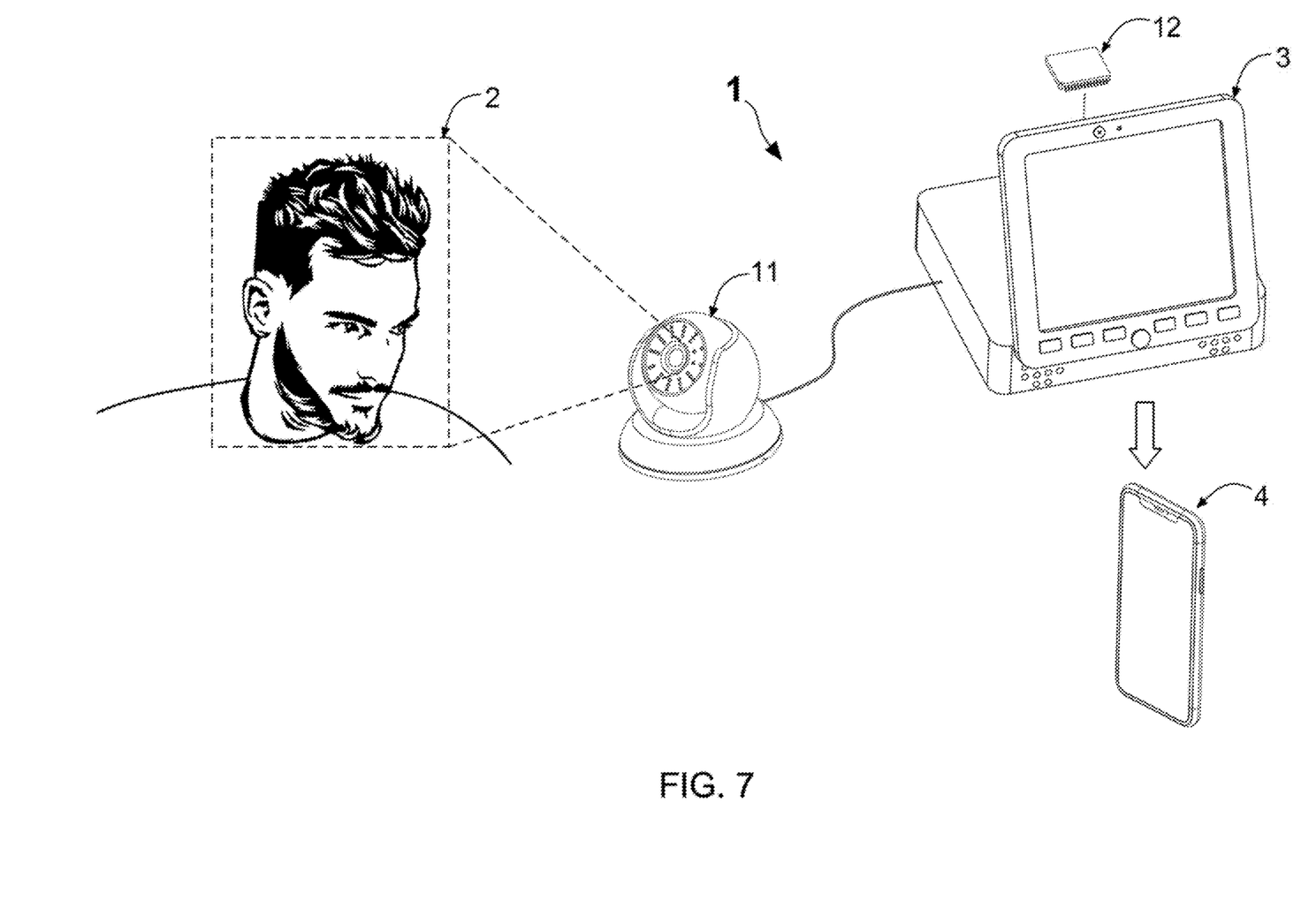
FIG. 7 shows a third schematic diagram for describing the health management system using contactless physiological measurement technology according to the present invention.
Figure 8:
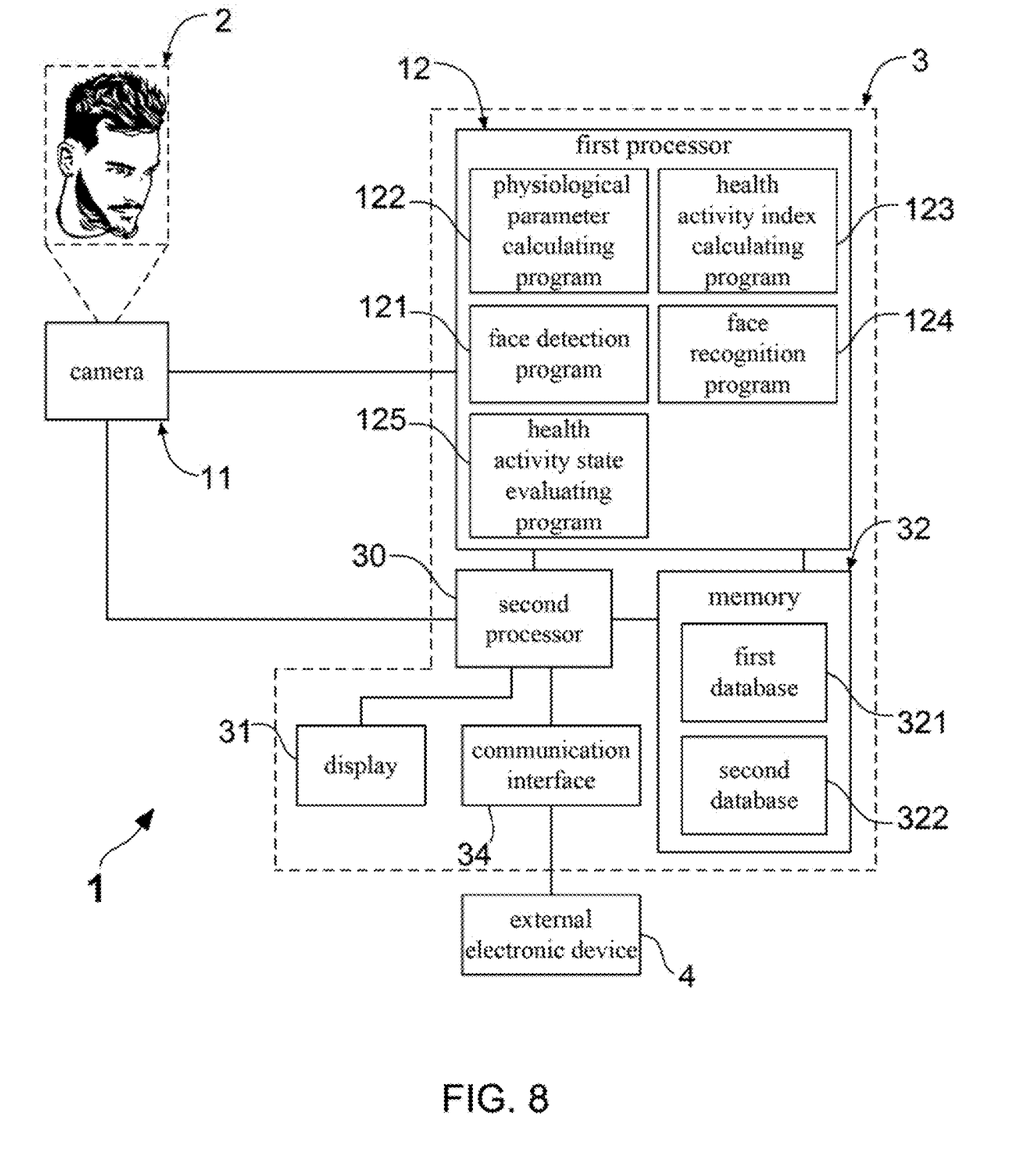
FIG. 8 shows a second block diagram of the health management system.

Furthermore, FIG. 7 shows a third schematic diagram for describing the health management system using contactless physiological measurement technology according to the present invention. Moreover, FIG. 8 shows a second block diagram of the health management system. As FIG. 7 and FIG. 8 show, the health management system 1 of the present invention comprises a camera 11, a first processor 12 and an electronic device 3, of which the electronic device 3 comprises a second processor 30, a display 31, a memory 32, and a communication interface 34. By such arrangement, the second processor 30 is able to communicate with an external electronic device 4 (e.g., user's smartphone) through the communication interface 34, so as to transmit the data comprising the plurality of health activity indexes and the plurality of physiological parameters to the external electronic device 4. In a practicable embodiment, the external electronic device 4 can be a smartphone, a smart watch, a tablet computer, or a laptop computer.

Therefore, through above descriptions, the health management system using contactless physiological measurement technology according to the present invention has been introduced completely and clearly. However, the embodiments are not intended to limit the scope of the present invention, and all equivalent implementations or alterations within the spirit of the present invention still fall within the scope of the present invention.

What is claimed is:

1. A health management system, comprising:
   a camera, being faced to a user for capturing a user image;
   a first processor, being coupled to the camera, and comprising one or more embedded programs including instructions for;
   detecting a face portion from the user image;
   extracting a photoplethysmography (PPG) signal from the face portion; and
   applying at least one signal process to the PPG signal, thereby generating a plurality of health activity indexes with respect to the user;
   wherein the plurality of health activity indexes comprises health index, activity index, stability index, relaxation index, metabolism index, and balance index;

wherein the at least one signal process consisting of converting the PPG signal to a time-domain signal, extracting a plurality of time-domain parameters from the time-domain signal and converting the plurality of time-domain parameters to the plurality of health activity indexes:

wherein the time-domain parameter is selected from a group consisting of standard deviation of all normal to normal intervals (SDNN), root mean square successive differences (RMSSD), number of pairs of adjacent normal to normal intervals differing by more than 50 ms (NN50), proportion of NN50 divided by a total number of all normal to normal intervals (pNN50).

2. The health management system of claim 1, wherein the first processor is integrated in an electronic device that is coupled to the camera, such that the first processor is therefore coupled to the camera.

3. The health management system of claim 2, wherein the electronic device is selected from a group consisting of cloud server, desktop computer, all-in-one computer, embedded computer, laptop computer, tablet computer, smart phone, smart watch, smart glasses, smart television, video door phone system, and home healthcare computer device.

4. The health management system of claim 2, wherein the electronic device comprises a second processor, a display, a memory, and a communication interface, and the second processor receiving the plurality of health activity indexes from the first processor, such that the second processor controls the display to show the plurality of health activity indexes by a form of numeric values and/or infographics.

5. The health management system of claim 4, wherein the first processor further comprises one or more embedded programs including instructions for:

extracting facial features from the face portion in the user image, and then applying a feature matching between the facial features and a facial feature template that is stored in the memory, thereby accomplishing a face recognition of the user; and evaluating a health activity state of the user according to the plurality of health activity indexes.

6. The health management system of claim 4, wherein the display is selected from a group consisting of television, computer monitor, portable monitor, projector screen, and touch screen monitor.

7. The health management system of claim 4, wherein the second processor communicates with an external electronic device through the communication interface.

8. The health management system of claim 4, wherein there are multiple databases established in the memory, and the multiple databases comprising:

a first database, storing N number of personal information sets, and also storing N number of the facial feature templates that are respectively corresponding to the N number of personal information sets; and a second database, storing a plurality of first data set and a plurality of second data set, wherein each the first data set consists of the plurality of physiological parameters, each the second data set consisting of the plurality of health activity indexes, and the plurality of first data set and the plurality of second data set being in accordance with the N number of personal information sets.

9. The health management system of claim 1, wherein the camera and the first processor are both integrated in an electronic device, and the electronic device being selected from a group consisting of all-in-one computer, embedded computer, laptop computer, tablet computer, smart phone, smart watch, smart glasses, smart television, video door phone system, and home healthcare computer device.

10. The health management system of claim 8, wherein the first processor further comprises one or more embedded programs including instructions for:

extracting a plurality of physiological parameters from the PPG signal, where the plurality of physiological parameters comprises heart rate (HR), heart rate variance (HRV), blood pressure, respiratory rate, and blood oxygen saturation (SpO2).

11. The health management system of claim 10, wherein the plurality of physiological parameters enclosed in the first data set are further classified into to a history data and an immediate data, and the plurality of health activity indexes enclosed in the second data set being further classified into a history data and an immediate data.

12. A health management system, comprising:

a camera, being faced to a user for capturing a user image;

a first processor, being coupled to the camera, and comprising one or more embedded programs including instructions for:

detecting a face portion from the user image;

extracting a photoplethysmography (PPG) signal from the face portion; and applying at least one signal process to the PPG signal, thereby generating a plurality of health activity indexes with respect to the user;

wherein the plurality of health activity indexes comprises health index, activity index, stability index, relaxation index, metabolism index, and balance index;

wherein the at least one signal process consisting of converting the PPG signal to a frequency-domain signal, extracting a plurality of frequency-domain parameters from the time-domain signal and converting the plurality of frequency-domain parameters to the plurality of health activity indexes;

wherein the frequency-domain parameter is selected from a group consisting of total power (TP), high frequency power (HF), low frequency power (LF), very low frequency power (VLF), ultra low frequency power (ULF), low frequency proportion (LF %), and LF/HF ratio.

13. A health management system, comprising:

a camera, being faced to a user for capturing a user image;

a first processor, being coupled to the camera, and comprising one or more embedded programs including instructions for:

detecting a face portion from the user image;

extracting a photoplethysmography (PPG) signal from the face portion; and applying at least one signal process to the PPG signal, thereby generating a plurality of health activity indexes with respect to the user;

wherein the at least one signal process comprising:

converting the PPG signal to a frequency-domain signal;

extracting a plurality of frequency-domain parameters from the time-domain signal;

converting the PPG signal to a time-domain signal;

extracting a plurality of time-domain parameters from the time-domain signal; and converting the plurality of frequency-domain parameters and the plurality of time-domain parameters to the plurality of health activity indexes;

wherein the plurality of health activity indexes comprises health index, activity index, stability index, relaxation index, metabolism index, and balance index;

wherein the frequency-domain parameter is selected from a group consisting of total power (TP), high frequency power (HF), low frequency power (LF), very low frequency power (VLF), ultra low frequency power (ULF), low frequency proportion (LF %), and LF/HF ratio;

wherein the time-domain parameter is selected from a group consisting of standard deviation of all normal to normal intervals (SDNN), root mean square successive differences (RMSSD), number of pairs of adjacent normal to normal intervals differing by more than 50 ms (NN50), proportion of NN50 divided by a total number of all normal to normal intervals (pNN50).

\* \* \* \* \*